United States Patent
Ang et al.

[11] Patent Number: 6,071,124
[45] Date of Patent: Jun. 6, 2000

[54] ANALOG TIME TEACHING DEVICE

[75] Inventors: Joseph Ang; Godfred E. Tong, both of Nassau, N.Y.

[73] Assignee: Hope Industries, Inc., Westbury, N.Y.

[21] Appl. No.: 09/032,466

[22] Filed: Feb. 26, 1998

[51] Int. Cl.[7] ............................................. G09B 19/12
[52] U.S. Cl. ............................................................ 434/304
[58] Field of Search .................................... 434/304, 188

[56] References Cited

U.S. PATENT DOCUMENTS

| | | | |
|---|---|---|---|
| D. 297,512 | 9/1988 | Kowalenko | D10/22 |
| 2,137,646 | 11/1938 | Dorr | 434/304 |
| 2,837,838 | 6/1958 | Lewis | 434/304 |
| 2,994,970 | 8/1961 | Spooner | 434/304 |
| 3,203,115 | 8/1965 | Friday | 434/304 |
| 3,364,599 | 1/1968 | Polsky | 434/304 |
| 4,015,346 | 4/1977 | Ogasawara | 434/304 |
| 4,128,949 | 12/1978 | Marason | 434/304 |
| 4,731,025 | 3/1988 | Taylor | 434/304 |
| 4,799,890 | 1/1989 | Thompson | 434/304 |
| 4,885,731 | 12/1989 | Massaro | 368/228 |
| 5,030,104 | 7/1991 | Caldwell | 434/304 |
| 5,040,987 | 8/1991 | Frazier | 434/188 |
| 5,167,507 | 12/1992 | Cobb | 434/304 |

FOREIGN PATENT DOCUMENTS

| | | | |
|---|---|---|---|
| 3-91792 | 4/1991 | Japan | 434/304 |
| 1030464 | 5/1966 | United Kingdom | 434/304 |
| 2207795 | 2/1989 | United Kingdom | 434/304 |

*Primary Examiner*—Kien T. Nguyen
*Assistant Examiner*—Kurt Fernstrom
*Attorney, Agent, or Firm*—Howard C. Miskin

[57] ABSTRACT

The present invention relates to a device that teaches how to tell time from an analog clock. More particularly, the invention relates to the integration of an analog clock and a digital clock into one single time teaching unit.

8 Claims, 7 Drawing Sheets

ANALOG TIME TEACHING DEVICE

BACKGROUND OF THE INVENTION

The present invention relates to a device that teaches how to tell time from an analog clock. More particularly, the invention relates to the integration of an analog clock and a digital clock into one single time teaching unit.

Learning to tell time from an analog clock is one of the most challenging and difficult skills that elementary school children need to learn in their arithmetic classes. The learning process generally covers a three year period of a child's education from kindergarten to second grade before most children can master this skill of telling time from an analog clock. While children are taught identity of numbers and how to count, this knowledge is not sufficient to allow the child to accept "2" for the hour hand is really "10" with respect to the minute hand and "3" means "15".

SUMMARY OF THE INVENTION

The invention is directed to a device that teaches a child how to tell time from an analog clock by utilizing coordinated colors and numbers to enhance the learning process.

The time teaching device integrates an analog clock with a digital clock by providing synchronized readings of an analog time and a digital time. The integration of the analog and digital clocks is further enhanced through color coordination and markings on the analog clock face.

Capitalizing on a child's mental and visual ability to relate through coordinated colors and numbers, he/she can intuitively learn to read an analog clock with minimal time and effort.

DETAILED DESCRIPTION OF THE PREFERRED EMBODIMENTS

Figure 1:
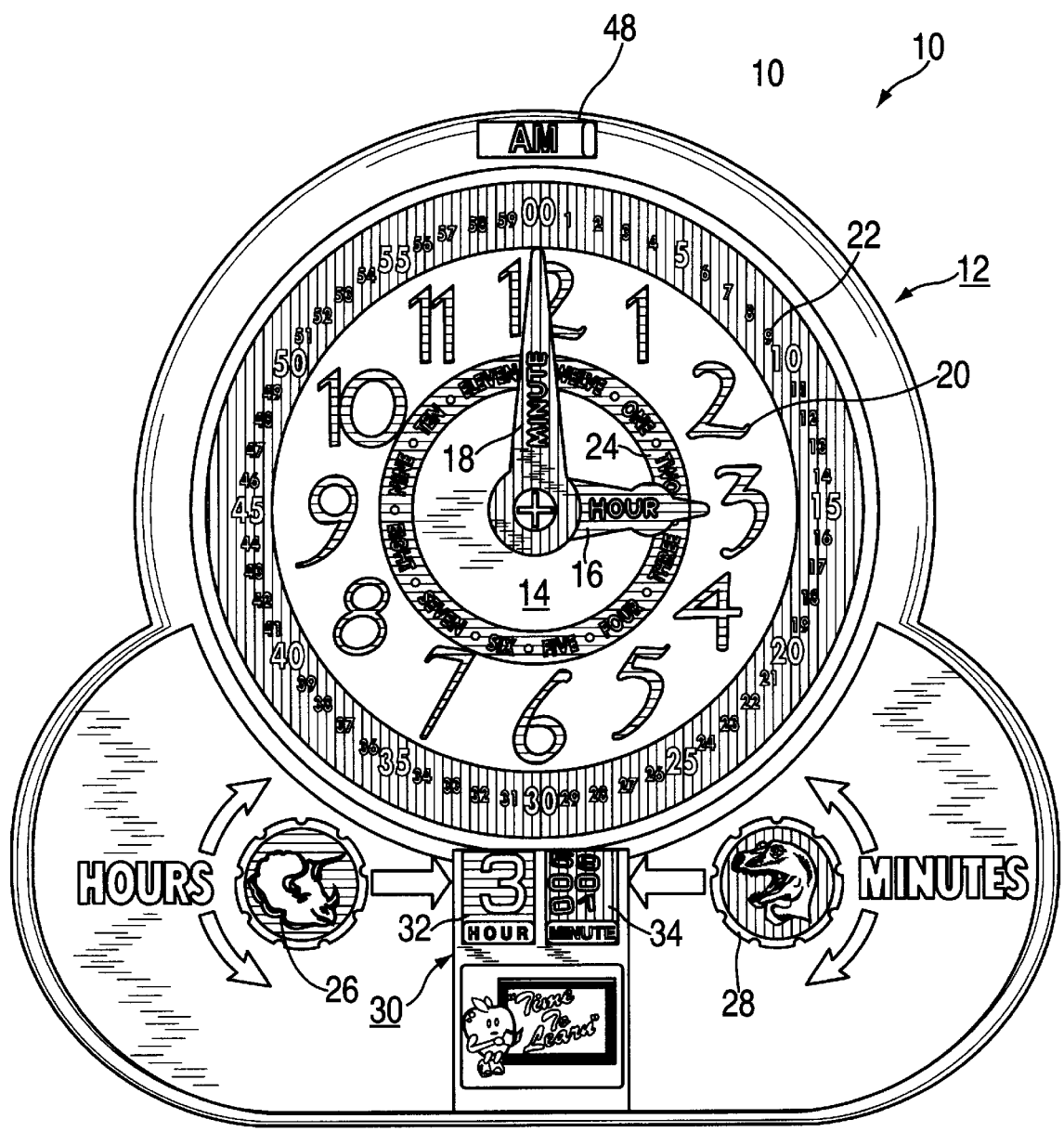
FIG. 1 is an illustration of one form of the present invention of a time teaching device that integrates an analog clock with a digital clock.

With reference to the drawings, wherein the same reference numbers are used to designate the same elements throughout, FIG. 1 shows one form of a time teaching device 10 that integrates an analog clock 12 with a digital clock 30.

Analog clock 12 has a conventional hour hand 16 with a longer minute hand 18. The analog clock face 14 is marked with the conventional numerical hour markings 20, the numbers one ("1") to twelve ("12"), distributed evenly around the clock face 14 at a radius slightly greater than the length of the hour hand 16. Along a concentric ring having a radius about the length of hour hand 16, are additional hour markings 24, spelled out. The word "one" to "twelve" are distributed evenly around the clock face 14, with the word "one" appearing between the numerical hour markings 20 "1" and "2", the word "two" between numerical hour markings 20 "2" and "3", and so forth. The analog clock face 14 is additionally marked with numerical minute markings 22, the numbers zero ("00") to fifty-nine ("59") are distributed evenly about a circle around the clock face 14 at a radius slightly greater than the length of the minute hand 18.

Figure 2:
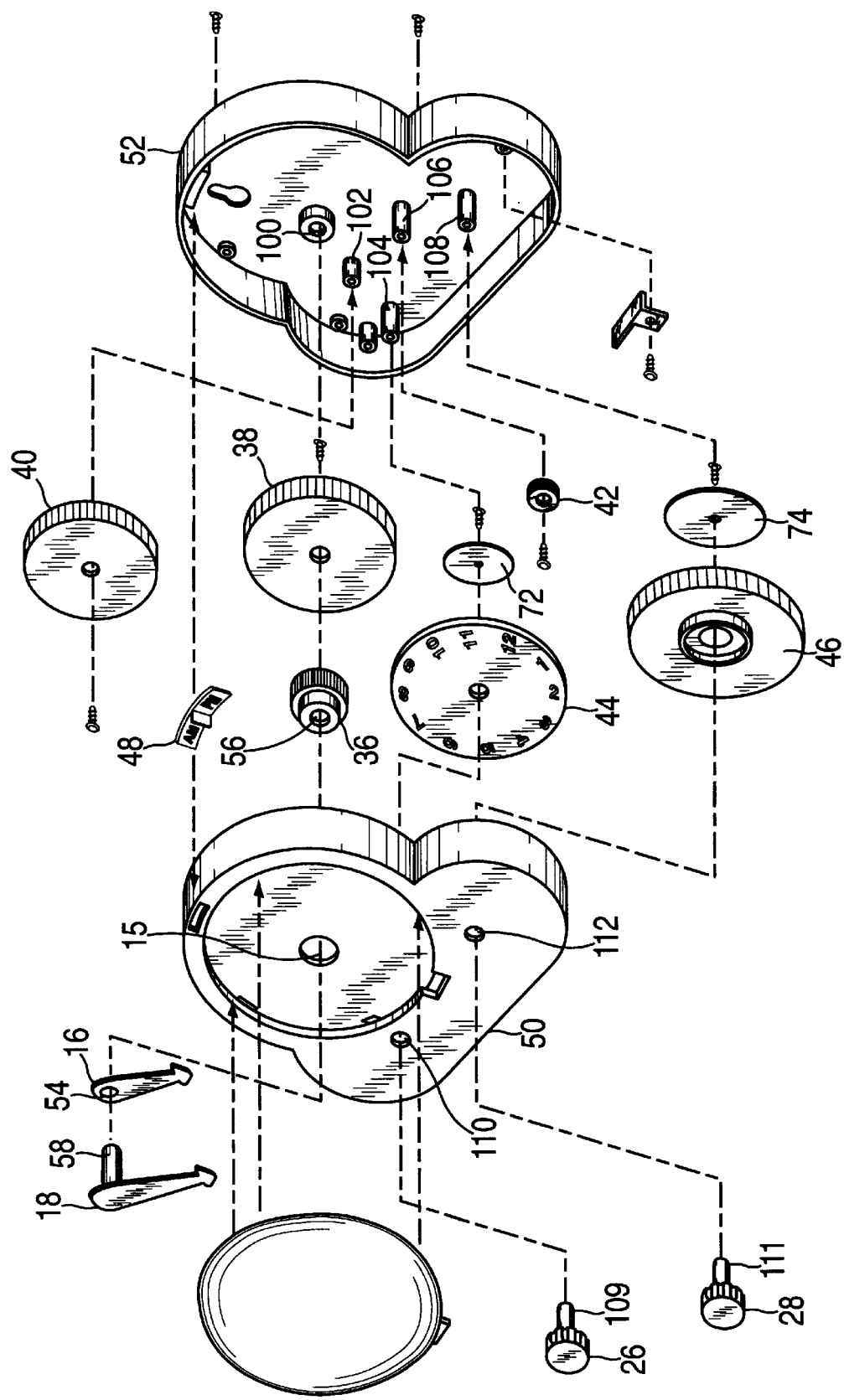
FIG. 2 is an exploded view in perspective showing the mechanisms of the present invention.
Figure 3:
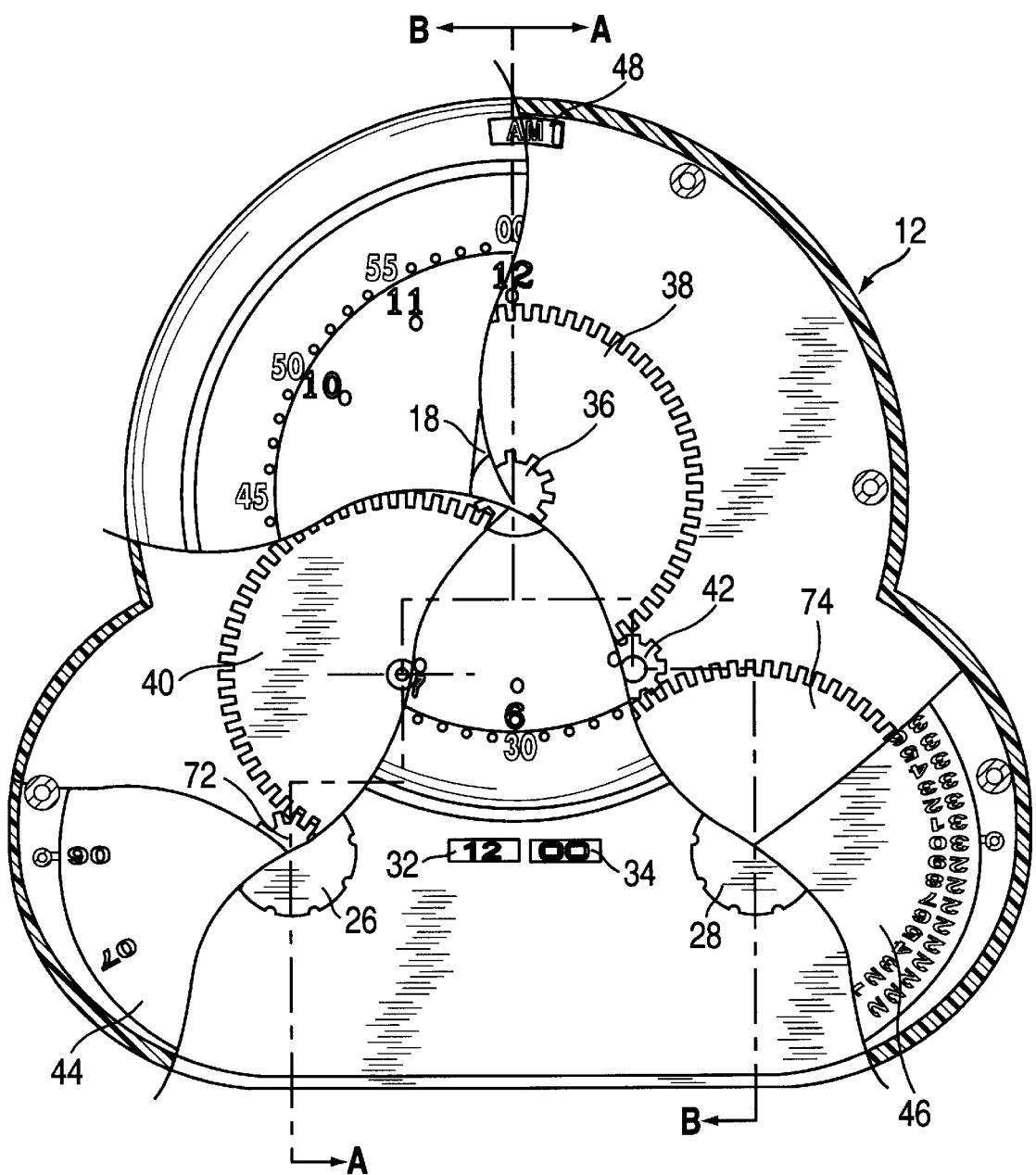
FIG. 3 shows the time teaching device, with parts broken away to show the mechanism of the present invention.

The digital clock 30 as shown in FIG. 1 displays the time in digital format by way of the hour read out shown at 32 and the minute read out, shown at 34. The digital clock 30 is synchronized with the analog clock 12 so as to display the analog time in the corresponding numerical digital format. The digital hour read out 32 also corresponds to the numerical hour markings 20, that the hour hand 16 points to, to promote an intuitive understanding of the relationship between analog and digital time. Similarly, the minute read out 34 corresponds to the numerical minute markings 22 to which the minute hand 18 points. The mechanism that achieves synchronization is shown in FIGS. 2 and 3.

The time teaching clock 10 as shown in FIG. 1 also has a slidable morning/afternoon indicator 48, adjacent to analog clock face 14, which allows a child to appreciate that each hour and minute position occurs twice a day, once in the morning and once in the afternoon.

The time teaching device 10 as shown in FIG. 1 is operated by two control knobs, the hour control knob 26 and the minute control knob 28. The hour control knob 26 controls the movements of both the hour hand 16 and the digital hour read out 32 to achieve synchronization of the analog clock 12 and the digital clock 30. Similarly, the minute control knob 28 controls the movements of both the minute hand 18 and the digital minute read out 34.

The time teaching clock 10 further integrates the analog clock 12 with the digital clock 30 through coordinated colors. Features indicating hours are in one color and those indicating minutes are in another contrasting color to further enhance the intuitive learning of the relationship between analog and digital time. Thus, one color is used for the hour hand 16, numerical hour markings 20, text hour markings 24, hour control knob 26 and hour read out 32, and another contrasting color for the minute hand 18, numerical minute markings 22, minute control knob 28 and minute read out 34.

FIG. 2 shows an exploded view of the mechanism of the time teaching clock 10 that synchronizes the analog clock 12 with the digital clock 30. The synchronization mechanism is within the space created between the front housing 50 and the back cover 52. The hour hand 16, having an opening 54 on one end, is axially attached to an first hour gear 36 having a tubular shaft 56 acting as a sleeve through an opening 15 in the front housing 50. The minute hand 18, having an elongated shaft 58, is axially attached to a first minute gear 38 through the opening 54 of the hour hand 16. Tubular shaft 56 of the first hour gear 36 is rotatably mounted onto the back cover 52 about a boss 100. The minute hand 18, hour hand 16, first hour gear 36 and first minute gear 38 are coaxially aligned for rotation about the axis of boss 100.

The first hour gear 36 engages a second hour gear 40, which is rotatably mounted to the back cover 52 about a post 102. Second hour gear 40, in turn, engages a third hour gear 72 attached to an hour disk or plate 44 that is rotatably mounted to the back cover 52 about a post 104. Similarly, first minute gear 38 engages a second minute gear 42, which is rotatably mounted to a post 106 on the back cover 52. Second minute gear 42, in turn, engages a third minute gear 74 attached to a minute disk or plate 46 that is rotatably mounted to a post 108 on the back cover 52. The hour disk 44 depicts markings of the numbers "1" to "12" distributed evenly about a circle adjacent the outer circumference of hour disk 46. The minute disk 46 depicts markings of the numbers "00" to "59" distributed evenly about a circle adjacent the outer the circumference of minute disk 46.

The shaft 109 of hour control knob 26 is axially attached through an opening 110 in the front housing 50 to the hour disk 44. Similarly, shaft 111 of the minute control knob 28 is axially attached through an opening 112 in the front housing 50 to the minute disk 46. The hour control knob 28 and the hour hand 16 move independently and freely from the minute control knob 28 and the minute hand 18 to enable trouble free repeated operations.

FIG. 3 shows the time teaching clock 10 with parts broken away to show the operation of the synchronization mechanism. The markings on the hour disk 44 and the minute disk 46 are shown through the digital hour read out 32 and the digital minute readout 34 on the front housing 50 of the digital clock. The gear ratios among the first gears 36 and 38, second gears 40 and 42, and the third gears 72 and 74 are set such that the readings of the analog clock 12 is synchronized with that of the digital clock 30. Rotation of the hour control knob 26 and the minute control knob 28 manipulate the third gears 72 and 74, which engage the corresponding second gears 40 and 42, which in turn engage the first gears 36 and 38 and the hour hand 16 and minute hand 18 attached to the first gears 36 and 38 to display corresponding readings on both the analog clock 12 and the digital clock 30.

The learning process of the time teaching clock 10 begins with the manipulation of the hour control knob 26 and the minute control knob 28. The time teaching clock 10 allows a child to intuitively learn to read the analog clock 12. As an example, FIG. 1 shows corresponding displays of the analog clock 12 and the digital clock 30. A child can learn to read the analog clock 12 by directly reading the digital hour read out 32 and the minute read out 34. In the alternative, a child can read the numerical hour marking 20 and the numerical minute marking 22 that the hour hand 16 and minute hand 18 directly point to. A child is directed to read the appropriate markings on the clock face 14 (hour markings 20 versus minute markings 22) with the aid of coordinated colors between the hour hand 16 and the minute hand 18 with the hour markings 20 and the minute markings 22.

Because the hour hand 16 of the analog clock 12 moves independently from the minute hand 18, the actual position of the hour hand 16 does not correspond with that on an actual operating clock. The time teaching clock 10 nevertheless teaches a child how to read the hour hand 16 if it appears between two numerical hour markings 20 with the aid of the text hour markings 24. For example, if the time is one-fifty-five (1:55), the hour hand 16 of an actual operating clock points closer to the numerical hour marking 20 "2" than marking "1". The text hour marking 24 "one" between the two numerical hour markings 20 reminds a child that the time has not passed two o'clock. The correct time is read off the text hour marking 24 to where the hour hand 16 points and the minute markings 22 to where the minute hand 18 points to.

Figure 4:
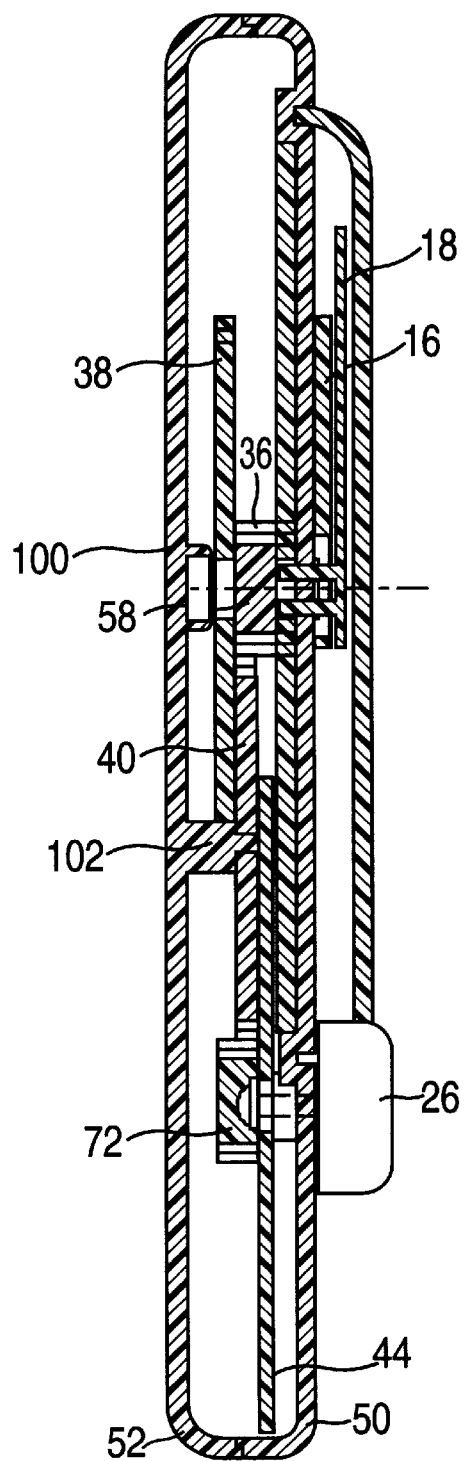
FIG. 4 is a sectional view taken along the line A—A of FIG. 3, illustrating details of the mechanism relating to the hour hand.

FIG. 4 is a sectional view of FIG. 3 taken along the line A—A showing the mechanism relating to the hour hand 16 only. The hour hand 16 is attached to the first hour gear 36, which engages second hour gear 40. The second hour gear 40, in turn, engages a third hour gear 72, which is rotatably controlled by hour knob 26.

Figure 5:
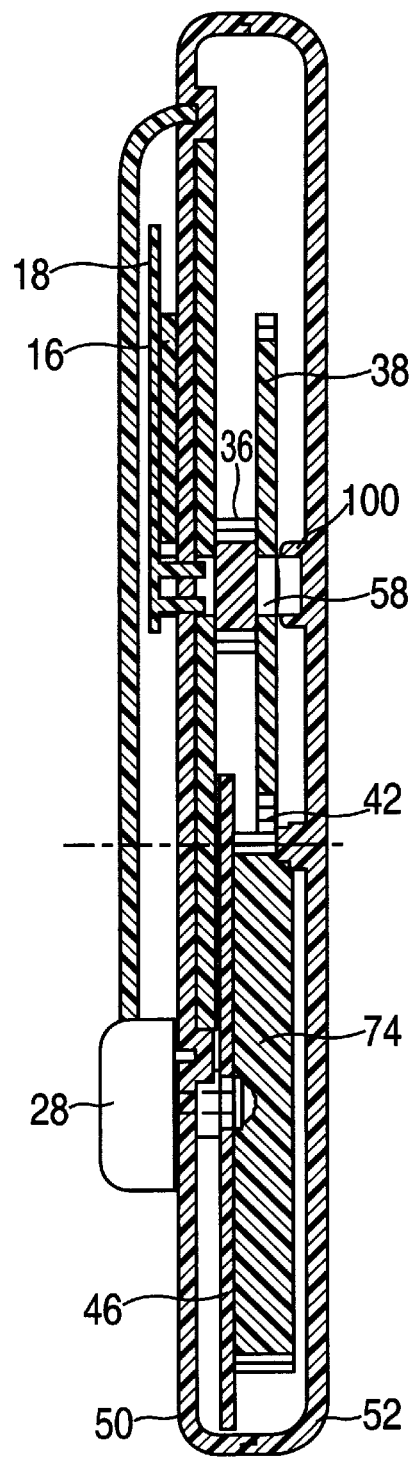
FIG. 5 is a sectional view taken along the line B—B of FIG. 3, illustrating details of the mechanism relating to the minute hand.

FIG. 5 is a sectional view of FIG. 3 taken along the line B—B showing the mechanism relating to the minute hand 18 only. The elongated shaft 58 of the minute hand 18 is attached to the first minute gear 38, which engages second minute gear 42. The second minute gear 42, in turn, engages a third minute gear 74, which is rotatably controlled by minute knob 28.

Figure 6:
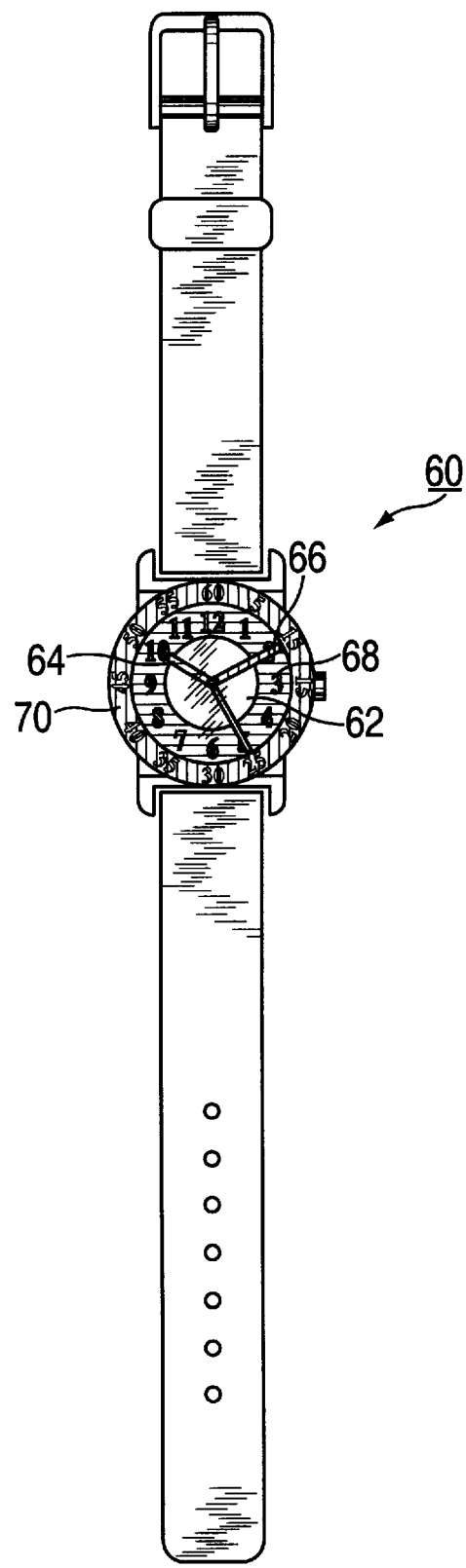
FIG. 6 is an illustration of a analog watch for use in conjunction with the time teaching device.

FIG. 6 shows an actual operating watch 60 for use in conjunction with the time teaching clock 10 to enhance a child's learning. The watch 60 is very similar to the analog clock 12 of the time teaching clock 10. The watch face 62 has coordinated colors for the hour hand 64 and hour markings 68 and for the minute hand 66 and minute markings 70. In comparison with the minute markings of the analog clock 12, the time teaching watch 60 is marked with five-minute interval minute markings 70, i.e. "5", "10", "15", etc.

The intuitive learning process of the time teaching clock 10 is enhanced and reinforced with the aid of the time teaching watch 60. The five-minute interval markings 70 and the lack of a text hour marking 24 and digital clock 30 make the reading of the analog time on the watch 60 slightly more challenging than the time teaching clock 10. By wearing the watch 60, a child can practice his/her skill in reading an analog clock anytime and anywhere.

The intuitive learning process may be further enhanced with an instructional booklet which details the features of and explains how to utilize the time teaching clock 10 and the time teaching watch 60 to obtain the maximum benefit of the invention. An integrated time teaching kit may comprise of the three items: an instructional booklet, a time teaching clock 10 and a time teaching watch 60.

Figure 7:
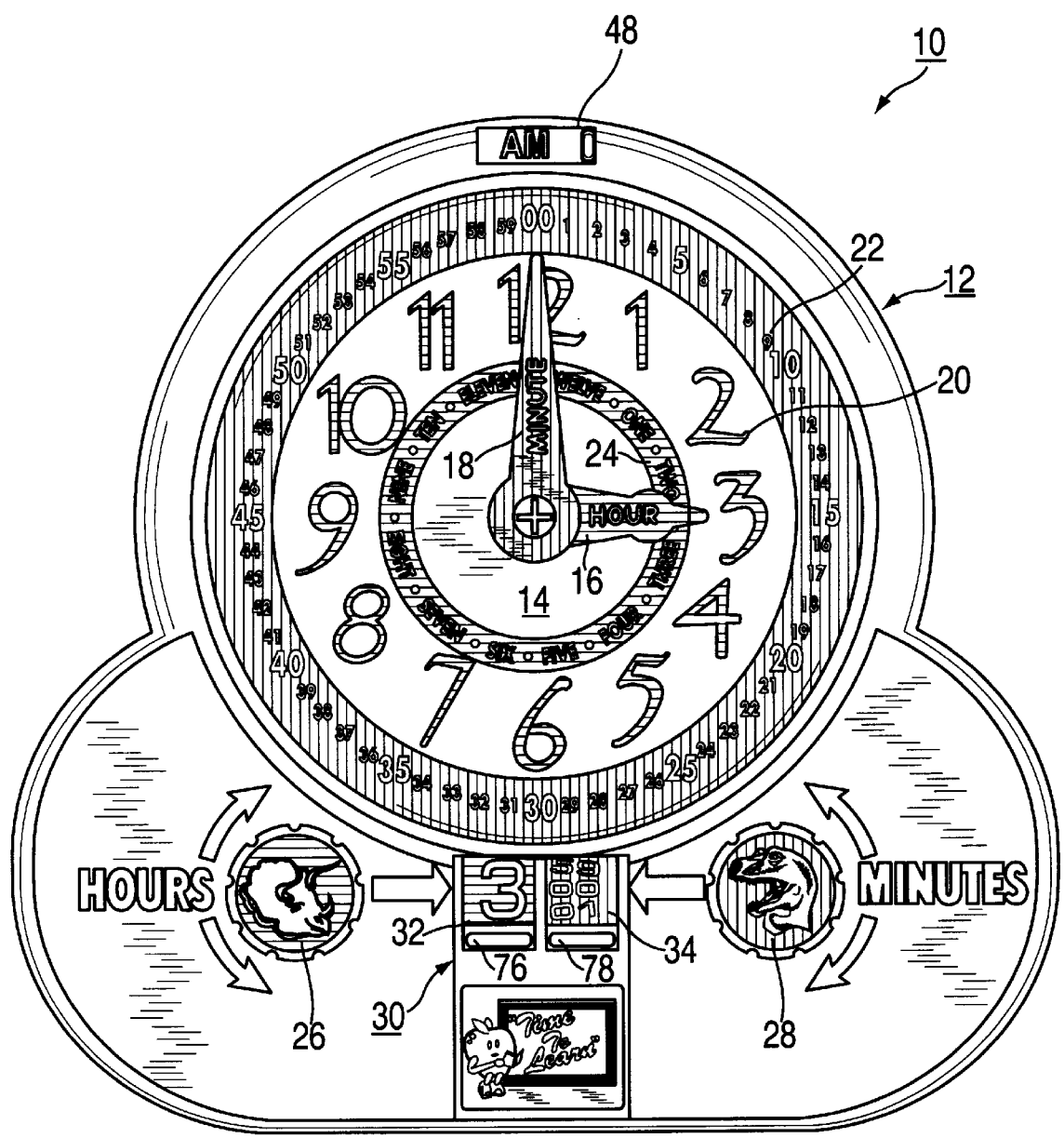
FIG. 7 is an illustration of a further embodiment of the present invention.

Referring to FIG. 7, a further embodiment of the time teaching clock 10 is shown with the digital clock 30 having an hour sliding door 76 and a minute sliding door 78 to cover the hour read out 32 and the minute read out 34, respectively. The sliding doors 76 and 78 are used to hide or reveal the digital clock 30. By closing the sliding doors 76 and 78, a child can test his/her skills in reading the analog clock 12 without the aid of the digital clock 30.

Figure 8:
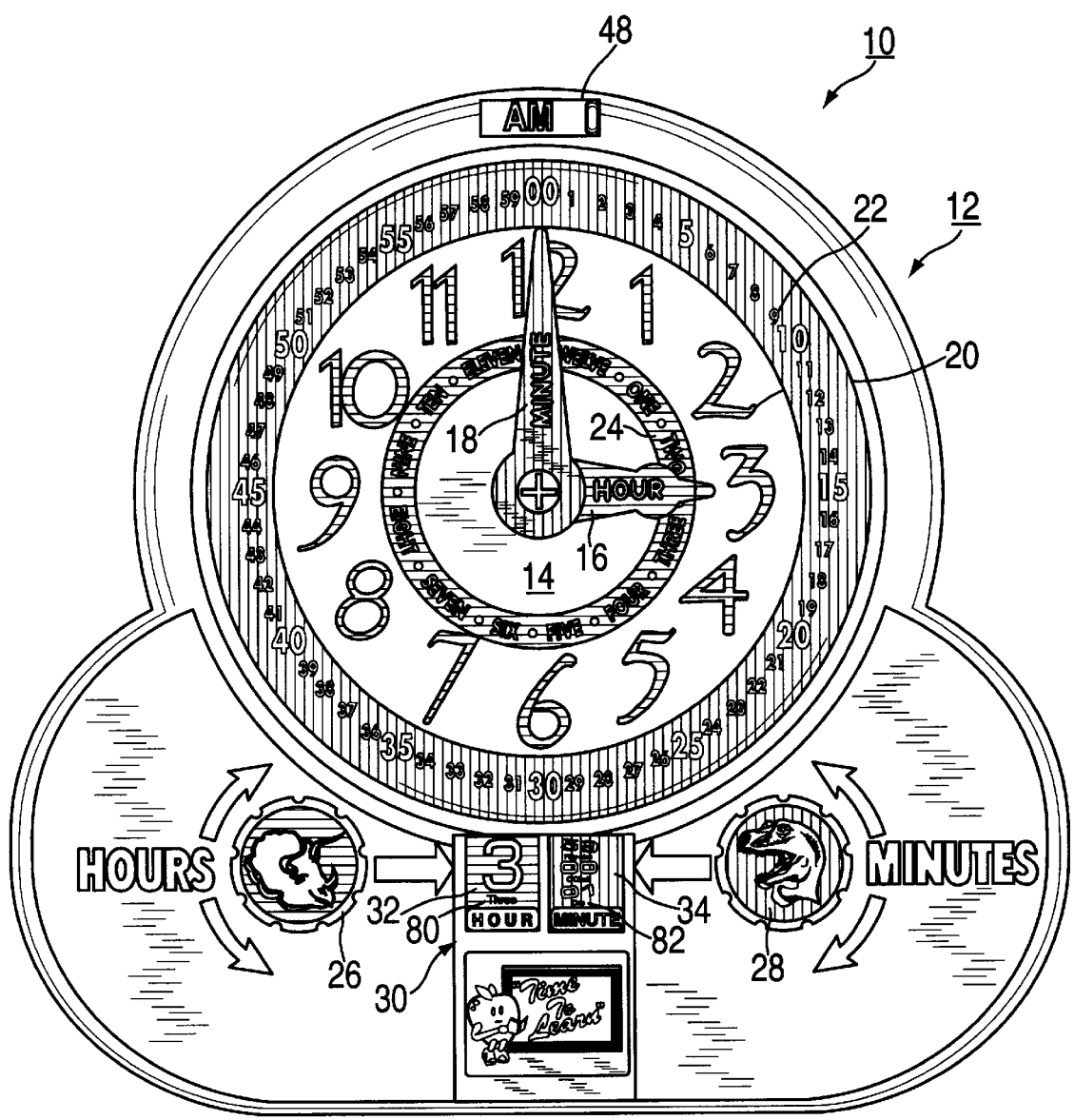
FIG. 8 is an illustration of another embodiment of the present invention.

FIG. 8 shows another embodiment of the time teaching clock 10 with the digital clock 30 displaying a text hour read out 80 and an text minute read out 82 along with the numerical hour read out 32 and the numerical minute read out 34. The text read outs 80 and 82 are imprinted on the hour disk 44 and the minute disk 46, immediately adjacent to the corresponding numbers. The text read outs 80 and 82 may be in a foreign language to teach a child how to read time in a different language.

While the invention has been described in complete detail and pictorially shown in the accompanying drawings, it is not to be limited to such details, since many changes and modifications may be made to the invention without departing form the spirit and the scope thereof. Hence, it is described to cover any and all modifications and forms which may come within the language and scope of the claims.

What we claim is:

1. A time teaching device for teaching the reading of time of an analog clock comprising:

(a) a clock comprises:

a clock face having a center opening with numerical and text hour markings and numerical minute markings circularly about the face;

an hour hand having a first end containing an opening;

a minute hand having a first end;

a shaft connected to said first end of said minute hand rotatably mounted through said opening of said hour hand and through said center of the clock face;

readout means for digitally indicating at an area adjacent to said clock face a plurality of numerical values corresponding to specific positions of said hour and minute hands relative to said clock face;

said readout means having a first section for digitally indicating positions of said hour hand relative to said clock face and a second section for digitally indicating positions of said minute hand relative to said clock face;

said readout means comprises a first disk having a first set of numerical values associated with said hour hand, and a second disk having a second set of numerical values associated with said minute hand;

first means for synchronizing said hour hand with said first section of the readout means, said first means connecting said opening of the hour hand through said center of the clock face with said first disk of the readout means;

said first means includes gear means for rotatably coupling said hour hand with said readout means;

second means for synchronizing said minute hand with said second section of the readout means, said second means connecting said shaft of the minute hand with said second disk;

said second means includes gear means for rotatably coupling said minute hand with said readout means; and actuating means for rotating said first and second disks of said readout means; and (b) a watch for reinforcing the teaching of said clock comprising:

a watch face having numerical hour and minute markings circularly about said watch face;

an hour hand; and a minute hand;

said numerical hour markings on said watch face and said hour hand of said watch are in said first color; and said numerical minute markings on said watch face and said minute hand of said watch are in said second color; wherein said numerical and text hour markings on said clock face and said hour hand are in a first color and said numerical minute markings on said clock face and said minute hand are in a second color and said numerical minute markings of said clock face comprise sixty numbers from zero to fifty-nine, at a single unit increment, and said numerical minute markings on said watch face comprise twelve numbers from five to sixty, at a five unit increment, such that reading time from said watch is more challenging than reading time from said clock to reinforce the learning of the reading of time of an analog clock.

2. A device as claimed in claim 1, wherein:

said first set of numerical values on said first disk is in said first color;

said second set of numerical values on said second disk in is said second color; and said actuating means having first and second parts for rotating said first and second disks, respectively, said first part is in said first color and said second part is in said second color.

3. A device as claimed in claim 2, wherein said clock further comprises display means for indicating at an area adjacent to said clock face morning or afternoon.

4. A device as claimed in claim 3, wherein said clock further comprises cover means for covering said readout means to prevent viewing of numerical values corresponding to specific positions of said hour and minute hands relative to said clock face and means for opening said cover means to permit viewing of numerical values corresponding to specific positions of said hour and minute hands.

5. A device as claimed in claim 4, wherein said first disk further having a first corresponding text markings adjacent to said first set of numerical values associated with said hour hand, and said second disk further having a second corresponding text markings adjacent to said second set of numerical values associated with said second hand.

6. A device as claimed in claim 5, wherein said first corresponding text markings on said first disk are in said first color and said second corresponding text markings on said second disk are in said second color.

7. A device as claimed in claim 6, wherein said first and second corresponding text markings on said first and second disks are in a foreign language.

8. A device as claimed in claim 7, wherein said watch is a wrist watch.

* * * * *